United States Patent
Baekby Bjarnoe

(10) Patent No.: US 11,926,439 B2
(45) Date of Patent: Mar. 12, 2024

(54) MULTI-STAGE ROCKET COMPRISING A RECOVERABLE ROCKET STAGE COMPRISING DRAG ENHANCING ELEMENTS, AND METHOD FOR LAUNCHING A MULTI-STAGE ROCKET AND RETURNING A RECOVERABLE ROCKET STAGE TO EARTH

(71) Applicants: ORBITAL EXPRESS LAUNCH LIMITED, London (GB); Jonas Baekby Bjarnoe, Bagsvaerd (DK)

(72) Inventor: Jonas Baekby Bjarnoe, Bagsvaerd (DK)

(73) Assignee: ORBITAL EXPRESS LAUNCH LIMITED, London (GB)

( * ) Notice: Subject to any disclaimer, the term of this patent is extended or adjusted under 35 U.S.C. 154(b) by 232 days.

(21) Appl. No.: 17/293,138

(22) PCT Filed: Nov. 13, 2019

(86) PCT No.: PCT/EP2019/081179
§ 371 (c)(1),
(2) Date: May 12, 2021

(87) PCT Pub. No.: WO2020/099488
PCT Pub. Date: May 22, 2020

(65) Prior Publication Data
US 2022/0081130 A1    Mar. 17, 2022

(30) Foreign Application Priority Data
Nov. 15, 2018 (EP) ..................... 18206476

(51) Int. Cl.
*B64G 1/62* (2006.01)
*B64G 1/00* (2006.01)

(52) U.S. Cl.
CPC ............... *B64G 1/002* (2013.01); *B64G 1/62* (2013.01)

(58) Field of Classification Search
CPC ........ B64G 1/002; B64G 1/222; B64G 1/402; B64G 1/62; B64G 1/641
See application file for complete search history.

(56) References Cited

U.S. PATENT DOCUMENTS

| | | | |
|---|---|---|---|
| 2,846,164 A | 8/1958 | Haberkorn | |
| 6,450,452 B1 * | 9/2002 | Spencer | B64G 1/14 244/159.3 |

(Continued)

FOREIGN PATENT DOCUMENTS

| | | |
|---|---|---|
| EP | 3348822 A1 | 7/2018 |
| WO | 98/13260 A1 | 4/1998 |

OTHER PUBLICATIONS

PCT International Search Report for corresponding Application No. PCT/EP2019/081179, dated Mar. 1, 2020.

(Continued)

*Primary Examiner* — Brady W Frazier
*Assistant Examiner* — Shanna Danielle Glover
(74) *Attorney, Agent, or Firm* — WIGGIN AND DANA LLP

(57) ABSTRACT

A recoverable rocket stage (2) for propelling a rocket (100) towards space includes a rocket propellant tank assembly (4) having a generally cylindrical outer shape; at least one engine (6), coupled to the rocket propellant tank assembly (4); and a plurality of drag enhancing elements (8), the plurality of drag enhancing elements (8) forming longitudinal extensions of the generally cylindrical outer shape of the rocket propellant tank assembly (4) in their launch positions and being inclinable with respect to the generally cylindrical (Continued)

outer shape of the rocket propellant tank assembly (4) for return of the recoverable rocket stage (2) to earth.

20 Claims, 10 Drawing Sheets

(56) References Cited

U.S. PATENT DOCUMENTS

| | | | | |
|---|---|---|---|---|
| 8,047,472 | B1* | 11/2011 | Brand | B64G 1/002 244/171.1 |
| 2015/0344139 | A1* | 12/2015 | Coleman | B63B 21/48 244/113 |
| 2017/0327249 | A1 | 11/2017 | Featherstone et al. | |

OTHER PUBLICATIONS

MoonMan22: "Fully Reusable Rocket (Both Stages!) in KSP", Youtube, Jun. 5, 2016 (Jun. 5, 2016), p. 3 pp. , XP054979415, Retrieved from the Internet: URL:https://www.youtube.com/watch?v=g0y2K3G5AkY [retrieved on May 22, 2019].

* cited by examiner

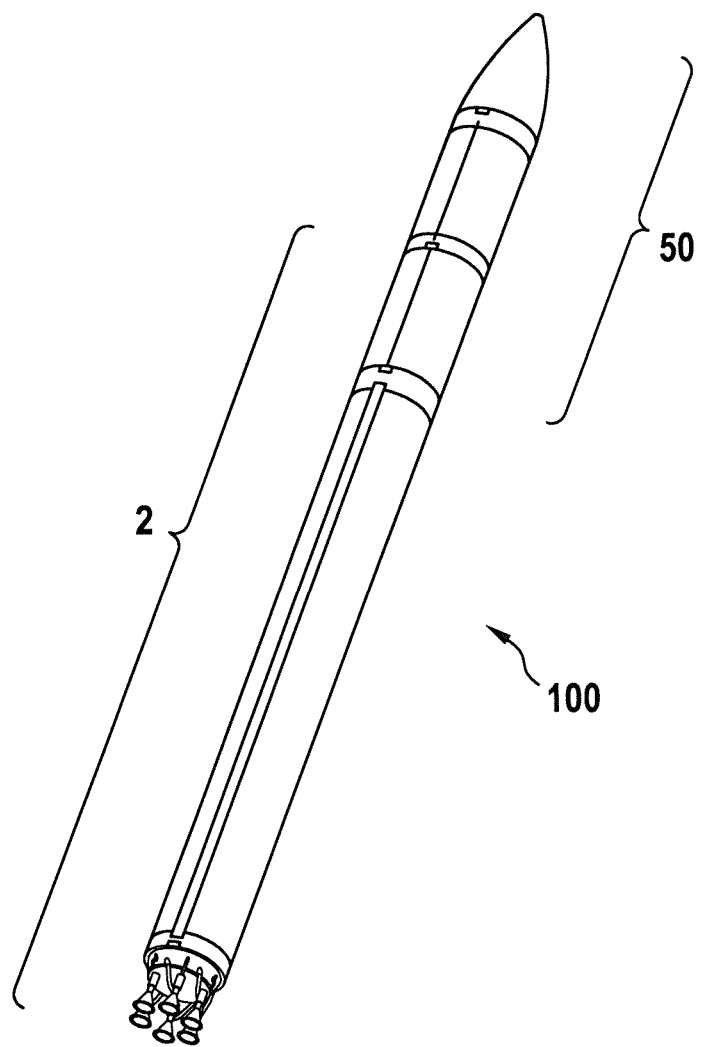

MULTI-STAGE ROCKET COMPRISING A RECOVERABLE ROCKET STAGE COMPRISING DRAG ENHANCING ELEMENTS, AND METHOD FOR LAUNCHING A MULTI-STAGE ROCKET AND RETURNING A RECOVERABLE ROCKET STAGE TO EARTH

CROSS-REFERENCE TO RELATED APPLICATIONS

This application is a national phase entry under 35 U.S.C. § 371 of International Application PCT/EP2019/081179, filed Nov. 13, 2019, which claims priority to European Patent Application No. 18206476.6, filed Nov. 15, 2018, all of which are herein incorporated by reference in their entirety.

FIELD OF THE INVENTION

The present invention is in the field of rockets for launching objects, such as satellites, into space. In particular, the present invention is in the field of multi-stage rockets.

BACKGROUND OF THE INVENTION

Various types of rockets are employed for launching objects into space. For example, various approaches are undertaken to make the launching of satellites into space more readily accessible. Irrespective of the kinds of objects to be launched, rockets have to deal with the issue that the structure and the fuel required for launching the rocket are very heavy compared to the object to be launched into space, commonly referred to as payload in terms of the rocket dynamics. Also, even for small objects to be carried, rockets are highly complex technical systems, requiring the integration of various sub-systems, the usage of high performance materials, and high precision manufacturing and assembly. For most launches, the rockets are single-use assemblies, being destroyed when falling through the atmosphere towards the earth and/or being destroyed upon hitting the earth and/or being discarded into space. While there have been attempts to re-use space travel equipment, such as NASA's Space Shuttle, single-use rockets are still most common.

Accordingly, it would be beneficial to make the re-use of rocket parts more accessible.

SUMMARY OF THE INVENTION

Exemplary embodiments of the invention include a recoverable rocket stage for propelling a rocket towards space, the recoverable rocket stage comprising a rocket propellant tank assembly having a generally cylindrical outer shape; at least one engine, coupled to the rocket propellant tank assembly; and a plurality of drag enhancing elements, the plurality of drag enhancing elements forming longitudinal extensions of the generally cylindrical outer shape of the rocket propellant tank assembly in their launch positions and being inclinable with respect to the generally cylindrical outer shape of the rocket propellant tank assembly for return of the recoverable rocket stage to earth.

Exemplary embodiments of the invention allow for slowing down the recoverable rocket stage during re-entry and/or during the terminal descent towards the earth, without negatively affecting the aerodynamics of the rocket during the launch. With the plurality of drag enhancing elements forming longitudinal extensions of the generally cylindrical outer shape of the rocket propellant tank assembly in their launch positions, the plurality of drag enhancing elements blend well into a generally cylindrical overall rocket structure and do not add drag during the launch phase. Being inclinable with respect to the generally cylindrical outer shape of the rocket propellant tank assembly, the plurality of drag enhancing elements may be selectively brought into a position where they increase the drag of the recoverable rocket stage. The plurality of drag enhancing elements may provide for an aerodynamically efficient longitudinal extension of the rocket propellant tank assembly and for an aerodynamically inefficient additional structure, increasing the drag area of the recoverable rocket stage, depending on their positions. Increasing the drag of the recoverable rocket stage may be effected via a comparably simple inclining action of the plurality of drag enhancing elements and may be achieved at a small mass penalty. Also, inclining of the plurality of drag enhancing elements may provide for a beneficial compromise between increasing drag and maintaining a geometric arrangement that is able to withstand the large thermal loads during re-entry. Further, the drag enhancing elements may help in re-orienting the recoverable rocket stage along its trajectory.

The plurality of drag enhancing elements are inclinable with respect to the generally cylindrical outer shape of the rocket propellant tank assembly. The plurality of drag enhancing elements may in particular be arranged around the circumference of the recoverable rocket stage. When inclining the plurality of drag enhancing elements, the drag enhancing elements spread into different directions from the generally cylindrical outer shape of the rocket propellant tank assembly. In particular, the plurality of drag enhancing elements may open in a petal-like manner. Inclining the plurality of drag enhancing elements may result in a flower-like opening of the structure provided by the drag enhancing elements in the launch positions.

The plurality of drag enhancing elements are inclinable with respect to the generally cylindrical outer shape of the rocket propellant tank assembly. In other words, the plurality of drag enhancing elements may be brought into an angled position with respect to the generally cylindrical outer shape of the rocket propellant tank assembly. The plurality of drag enhancing elements may be angled away from their alignment with the generally cylindrical outer shape of the rocket propellant tank assembly in the launch positions. The terms inclined and angled may encompass inclination angles of more than 0° and up to 90°, in particular of more than 15° and up to 90°.

The plurality of drag enhancing elements form longitudinal extensions of the generally cylindrical outer shape of the rocket propellant tank assembly in their launch positions. The outer surfaces of the drag enhancing elements may blend into an imaginary extension of the cylindrical outer surface of the rocket propellant tank assembly. The term generally cylindrical refers to the outer shape of the rocket propellant tank assembly having a circular cross-section of continuous radius along most of its longitudinal extension. The term generally cylindrical does not exclude the presence of individual elements that do not blend into the cylindrical outer shape, such as control fins, cable ducts, etc.

The term drag enhancing element refers to a structure that can increase the drag area of the recoverable rocket stage, withstanding the aerodynamic and thermal loads during return of the recoverable rocket stage to earth. In particular, each of the plurality of drag enhancing elements may have a first end, arranged at or adjacent to the imaginary extension of the cylindrical outer surface of the rocket propellant tank assembly, and a second end, spaced radially outwards from the imaginary extension of the cylindrical outer surface of the rocket propellant tank assembly, when in an inclined position. The term drag enhancing element refers to a structure that enhances drag of the recoverable rocket stage, when in an inclined position.

The recoverable rocket stage is recoverable after being launched into/towards space and being returned to earth. The recoverable rocket stage may be re-used for one or more further launches into/towards space. The recoverable rocket stage may be re-usable, with maintenance and partial re-work after recovery of the rocket stage not being excluded by the term re-usable.

The term rocket, as used herein, refers to a space rocket, i.e. to a launch vehicle that allows for carrying an object into space. The rocket may be a single stage rocket or a multi-stage rocket, such as a two-stage rocket or a three-stage rocket.

The rocket propellant tank assembly may comprise two or more tanks. In particular, the rocket propellant tank assembly may comprise an oxygen tank and a fuel tank. Further in particular, the rocket propellant tank assembly may comprise an oxygen tank for storing liquid oxygen and a fuel tank for storing liquid fuel. The liquid fuel may for example be liquid propane or liquid propene or liquid propylene. Reference is made to EP 3 348 822 A1, which is incorporated herein by reference and which contains details of possible configurations of the rocket propellant tank assembly.

According to a further embodiment, the recoverable rocket stage further comprises an actuator assembly configured to incline the plurality of drag enhancing elements with respect to the generally cylindrical outer shape of the rocket propellant tank assembly. The actuator assembly may have separate actuators for the plurality of drag enhancing elements. In particular, an individual actuator may be provided for each of the plurality of drag enhancing elements.

According to a further embodiment, the actuator assembly comprises, for each of the plurality of drag enhancing elements, a hinge, coupling a first end of the respective drag enhancing element to the rocket propellant tank assembly, and an actuator for rotating the respective drag enhancing element around the hinge. By rotating the respective drag enhancing element around its hinge, the drag enhancing element in question may be brought into an inclined position. The actuators may be configured to move the second ends of the drag enhancing elements radially outwards. The actuators may exert the inclining force onto the drag enhancing elements at any suitable position along the longitudinal extension thereof. The actuators may also exert the inclining force onto structural support elements that distribute the inclining force over respective extended areas of the drag enhancing elements. The first ends of the drag enhancing elements may be coupled directly to the rocket propellant tank assembly by means of the hinges. It is also possible that the first ends of the drag enhancing elements may be coupled to the rocket propellant tank assembly via an interposed support ring. The support ring may also be referred to as skirt of the rocket propellant tank assembly.

According to a further embodiment, the actuator assembly is configured to incline the plurality of drag enhancing elements up to 90° with respect to the generally cylindrical outer shape of the rocket propellant tank assembly. The actuator assembly may be configured to incline the plurality of drag enhancing elements at one or more predefined inclination angles. It is also possible that the actuator assembly is configured to allow for a variable adaptation of the inclination angles.

According to a further embodiment, the plurality of drag enhancing elements comprise between 2 and 8 drag enhancing elements, in particular between 3 and 6 drag enhancing elements, further in particular 4 drag enhancing elements. The plurality of drag enhancing elements may consist of 2, 3, 4, 5, 6, 7, or 8 drag enhancing elements, in particular of 3, 4, 5, or 6 drag enhancing elements, further in particular of 4 drag enhancing elements. The given numbers of drag enhancing elements provide for a good compromise between complexity, effectiveness, and operability. In the exemplary case of the recoverable rocket stage having exactly 4 drag enhancing elements, the increase of drag may be well-distributed around the four quadrants of the recoverable rocket stage. The recoverable rocket stage may be slowed down with a high degree of orientation stability and controllability.

According to a further embodiment, the plurality of drag enhancing elements are cylinder shell portions. In other words, each of the plurality of drag enhancing elements has the shape of a cylinder shell portion. In yet other words, each of the plurality of drag enhancing elements has an outer surface that is a portion of cylinder surface. The cylinder shell portions may be seen as portions of a hollow cylinder. The cylinder shell portions may in particular have a constant width along their longitudinal extensions, i.e. a constant length circular arc along their longitudinal extensions. The left and right edges of each cylinder shell portion may be straight. The left and right edges of each cylinder shell portion may be aligned with the longitudinal extension of the rocket propellant tank assembly, when in the launch position. Having the shape of cylinder shell portions, the drag enhancing elements are particularly well-suited to extend the generally cylindrical outer shape of the rocket propellant tank assembly in an aerodynamically efficient manner and to blend into the generally cylindrical outer shape of the rocket. Also, having the shape of cylinder shell portions, the drag enhancing elements are particularly well-suited to forming a continuous outer surface upon being positioned adjacent to each other in the launch positions.

According to a further embodiment, the plurality of drag enhancing elements jointly form a cylinder shell in their launch positions. In other words, the plurality of drag enhancing elements jointly form a hollow cylinder. In yet other words, the plurality of drag enhancing elements combine to form a closed ring structure, when in their launch positions. In this way, a multi-purpose hollow cylinder section may be provided along the length of the rocket. The plurality of drag enhancing elements may provide for the increase of drag during re-entry/descent and may provide for a cylinder shell around other components of the rocket during launch. In this way, the provision of the inclinable drag enhancing elements may come at a very small mass penalty, as compared to previous approaches, where a discardable hollow cylinder was used for shielding rocket components and/or for aerodynamic purposes. In particular, the provision of the drag enhancing elements may come substantially only at the mass penalty of the actuator assembly and, potentially, at the mass penalty of materials targeted to the drag enhancing operation. Hollow cylinder structures of previous approaches may be replaced with the plurality of drag enhancing elements, without having to re-design the entire rocket. Above described re-usability may be achieved at little additional complexity and weight.

According to a further embodiment, each of the plurality of drag enhancing elements has a continuous outer surface. In this way, the drag enhancing elements provide for a particularly effective increase in drag. The continuous outer surfaces provide for a high increase in drag per unit area of the drag enhancing elements. It has been found that grid fins, as used along tank assemblies in previous approaches for controlling the trajectory of the rocket, do not work well for slowing down the recoverable rocket stage. Accordingly, it is not feasible to simply use existing grid fins for the purpose of slowing down a rocket stage for re-usability.

According to a further embodiment, the plurality of drag enhancing elements are made of a composite material, such as carbon fiber reinforced polymers or fiberglass, or made of metal, such as aluminum alloys, stainless steel alloys or titanium alloys, or made of metal foam, e.g. based on aluminum alloys, aluminum lithium alloys, stainless steel alloys or titanium alloys. The plurality of drag enhancing elements may have honeycomb or foam core structures, involving the aforementioned materials. The plurality of drag enhancing elements may also comprise combinations of the aforementioned materials. It is further possible that the plurality of drag enhancing elements have a surface protection coating, at least on their outer surfaces. The surface protection coating may be ceramic-based or polymer-based or metal-based, such as aluminum-, titanium or nickel-based.

According to a further embodiment, the plurality of drag enhancing elements form at least part of an interstage support structure. In particular, the plurality of drag enhancing elements may form at least part of an interstage support structure configured to connect the rocket propellant tank assemblies of the recoverable rocket stage and a further rocket stage. Further in particular, the plurality of drag enhancing elements may form at least part of an interstage support structure that surrounds at least part of the one or more engines of the further rocket stage. The plurality of drag enhancing elements may also form the entire or substantially the entire interstage support structure. Using the plurality of drag enhancing elements both for coupling two rocket stages during launch and for slowing down the recoverable rocket stage during re-entry/descent is a very efficient use of resources and weight. The plurality of drag enhancing elements may form an upper end of the recoverable rocket stage. In this way, they are particularly well-positioned to couple the recoverable rocket stage to a further rocket stage or payload section and to provide the drag enhancing effect at the rear end of the recoverable rocket stage during re-entry, which may be beneficial in withstanding thermal loads.

According to a further embodiment, the plurality of drag enhancing elements are structural connection elements between the recoverable rocket stage and a further rocket stage. The term structural connection elements refers to those elements that facilitate the attachment between the recoverable rocket stage and the further rocket stage and that absorb relative forces between the recoverable rocket stage and the further rocket stage. In a particular embodiment, the plurality of drag enhancing elements are the sole structural connection elements between the recoverable rocket stage and the further rocket stage. The plurality of drag enhancing elements may provide for the full structural integration of the recoverable rocket stage and the further rocket stage during launch.

According to a further embodiment, the at least one engine is arranged on a first end portion of the rocket propellant tank assembly and the plurality of drag enhancing elements are arranged on a second end portion of the rocket propellant tank assembly, opposite the first end portion. In particular, the at least one engine may be arranged on a lower end of the rocket propellant tank assembly and the plurality of drag enhancing elements may be arranged on an upper end of the rocket propellant tank assembly. In this way, the plurality of drag enhancing elements may orient and control the recoverable rocket stage in an arrow-like manner during re-entry/descent, while the at least one engine faces the Earth. Potential damage to the recoverable rocket stage upon hitting the ground may thus be constrained to the engine portion, leaving the rocket propellant tank assembly and the inner connections of the recoverable rocket stage in a good position to withstand the impact.

According to a further embodiment, the recoverable rocket stage comprises a parachute system. The parachute system may comprise one or more parachutes. In this way, the recoverable rocket stage may be additionally slowed down by one or more parachutes during the terminal descent. The plurality of drag enhancing elements and the parachute system may cooperate in a particularly beneficial manner. The plurality of drag enhancing elements may slow down the recoverable rocket stage to such a large extent that a comparably small parachute system is sufficient for providing a desired additional deceleration. Such a parachute system may contribute little extra weight to the recoverable rocket stage.

According to a further embodiment, the plurality of drag enhancing elements are rotatable around their longitudinal axes for controlling rotation of the recoverable rocket stage around its longitudinal axis. In particular, the actuator assembly may have a pitch actuator for each of the plurality of drag enhancing elements. The plurality of drag enhancing elements may be tilted around their longitudinal axes. In this way, they do not form symmetrical structures for the impinging airstream during descent. Rather, the drag enhancing elements may form air foils that impart an angular momentum onto the recoverable rocket stage. Due to the ensuing rotation, the recoverable rocket stage may be slowed down even further. The recoverable rocket stage may enter a state of flare during descent, in particular during the terminal descent.

According to a further embodiment, one or more of the at least one engine are re-startable. In particular, each of the at least one engine may be re-startable. Re-starting one or more of the at least one engine may contribute to the deceleration of the recoverable rocket stage. The restartable engine(s) may cooperate well with the plurality of drag enhancing elements. The plurality of drag enhancing elements may orient the at least one engine downwards, such that its operation is particularly efficient in slowing down the recoverable rocket stage. The recoverable rocket stage may have a dual ignition system, with a first igniter or a set of first igniters starting the operation of the at least one engine for the launch and with a second igniter or a set of second igniters starting the one or more of the at least one engine during descent. The one or more of the at least one engine may be operated for the final stages of the descent, i.e. for the terminal descent.

According to a further embodiment, the recoverable rocket stage is the primary rocket stage of the rocket. By definition, the primary rocket stage is the rocket stage that is ignited for effecting the initial ascent from ground. The primary rocket stage may be configured to propel the rocket to a height of between 60 km and 100 km. The provision of the plurality of drag enhancing elements is particularly useful for the primary rocket stage, because a large portion of material, manufacturing effort, and assembly effort are spent on the primary rocket stage. Re-using some or even all of the primary rocket stage is therefore highly beneficial.

According to a further embodiment, the recoverable rocket stage has a height of between 5 m and 25 m, in particular of between 10 m and 20 m, further in particular of between 12 m and 16 m. The drag enhancing elements may have a length of between 0.5 m and 3 m. The diameter of the recoverable rocket stage may be between 0.5 m and 2 m, in particular between 1 m and 1.5 m. With above size parameters, the recoverable rocket stage may provide for a particularly good compromise between tank capacity and flight dynamics during re-entry/descent.

According to a further embodiment, the length of the drag enhancing elements is between 10% and 20%, in particular between 12% and 17%, further in particular about 15%, of the height of the recoverable rocket stage.

According to a further embodiment, the rocket has a height of between 10 m and 30 m, in particular of between 12 m and 25 m, further in particular of between 15 m and 20 m.

Exemplary embodiments of the invention further include a multi-stage rocket, comprising a recoverable rocket stage, as described in any of the embodiments above. The multi-stage rocket may in particular comprise the recoverable rocket stage and one or two further rocket stages. The additional features, modifications, and beneficial effects, described above with respect to the recoverable rocket stage, apply to the multi-stage rocket in an analogous manner.

According to a further embodiment, the multi-stage rocket is configured to carry a payload of between 50 kg and 300 kg into space. For this comparably low mass payload, the use of a recoverable rocket stage is particularly beneficial.

Exemplary embodiments of the invention further include an interstage support structure for coupling a first rocket stage to a second rocket stage in a rocket, the interstage support structure comprising a support ring, having a generally cylindrical outer shape; and a plurality of drag enhancing elements, the plurality of drag enhancing elements forming longitudinal extensions of the generally cylindrical outer shape of the support ring in their launch positions and being inclinable with respect to the generally cylindrical outer shape of the support ring. The additional features, modifications, and beneficial effects, described above with respect to the recoverable rocket stage, apply to the interstage support structure in an analogous manner.

Exemplary embodiments of the invention further include a method for launching a multi-stage rocket and for returning a recoverable rocket stage of the multi-stage rocket to earth, wherein the recoverable rocket stage comprises a plurality of drag enhancing elements, the method comprising launching the multi-stage rocket, with the plurality of drag enhancing elements forming longitudinal extensions of a generally cylindrical outer shape of a rocket propellant tank assembly of the recoverable rocket stage; and returning the recoverable rocket stage to earth, with the plurality of drag enhancing elements being inclined with respect to the generally cylindrical outer shape of the rocket propellant tank assembly. The additional features, modifications, and beneficial effects, described above with respect to the recoverable rocket stage, apply to the method for launching a multi-stage rocket and for returning a recoverable rocket stage of the multi-stage rocket to earth in an analogous manner. Method steps corresponding to the device features, as described above, are explicitly disclosed herewith.

According to a further embodiment, the method further comprises de-coupling the recoverable rocket stage from a further rocket stage; and inclining the plurality of drag enhancing elements with respect to the generally cylindrical outer shape of the rocket propellant tank assembly for re-orienting the recoverable rocket stage. The de-coupling and the inclining of the plurality of drag enhancing elements may be carried out subsequently in any order or substantially at the same time. It is also possible that the de-coupling and the inclining may be part of an orchestrated procedure for separating and distancing the recoverable rocket stage and the further rocket stage. In particular, the inclining of the plurality of drag enhancing elements may be carried out, before the further rocket stage is ignited. Further in particular, the re-orienting may be induced by the engine plume of the further rocket stage. The plurality of drag enhancing elements may contribute to the prevention of an uncontrolled spin of the recoverable rocket stage. For re-orienting the recoverable rocket stage, the plurality of drag enhancing elements may be inclined at a re-orientation inclination angle with respect to the generally cylindrical outer shape of the rocket propellant tank assembly.

According to a further embodiment, the method further comprises inclining the plurality of drag enhancing elements with respect to the generally cylindrical outer shape of the rocket propellant tank assembly for slowing down the recoverable rocket stage during re-entry. The expression of slowing down the recoverable rocket stage during re-entry does not require the plurality of drag enhancing elements to be inclined at all times during the fall towards the earth. It is also not required that the recoverable rocket stage falls through all layers of the atmosphere. The recoverable rocket stage may for example burn out at heights of between 60 km and 100 km. For slowing down the recoverable rocket stage during re-entry, the plurality of drag enhancing elements may be inclined at a re-entry inclination angle with respect to the generally cylindrical outer shape of the rocket propellant tank assembly. This re-entry inclination angle may be the same or different from the re-orientation inclination angle, discussed above. It is also possible that the plurality of drag enhancing elements assume various different re-entry inclination angles, depending on the current height and/or other momentary flight parameters.

BRIEF DESCRIPTION OF THE DRAWINGS

Further exemplary embodiments will be described with respect to the accompanying drawings, wherein.

DETAILED DESCRIPTION OF THE INVENTION

Figure 1:
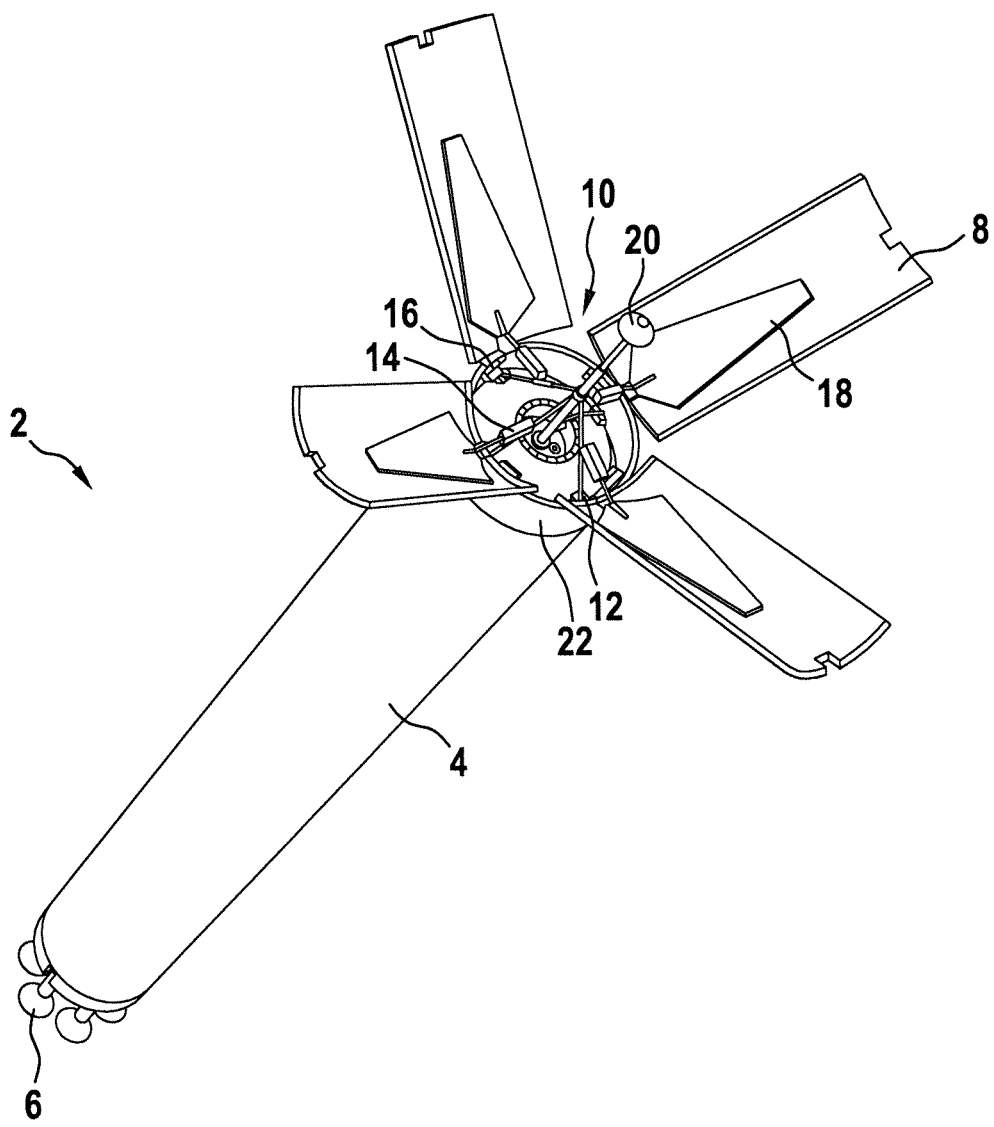
FIG. 1 shows a recoverable rocket stage in accordance with an exemplary embodiment of the invention in a perspective view.

FIG. 1 shows a recoverable rocket stage 2 in accordance with an exemplary embodiment of the invention in a top perspective view. The recoverable rocket stage 2 has a cylindrical rocket propellant tank assembly 4 and six engines 6. The rocket propellant tank assembly 4 has a fuel tank and an oxygen tank. In the exemplary embodiment of FIG. 1, the recoverable rocket stage 2 is configured to operate with propane as fuel. The fuel tank is configured to store liquid propane, and the oxygen tank is configured to store liquid oxygen. Each of the six engines 6 is in fluid communication with both the oxygen tank and the fuel tank. In each of the six engines 6, fuel is combusted and the exhaust gases are ejected through a respective nozzle. In the exemplary embodiment of FIG. 1, the six engines are individually controllable, in particular individually orientable. A desired direction of the effective propulsion of the six engines may be chosen, in order to steer the rocket in a desired manner, when propelled by the recoverable rocket stage 2.

The recoverable rocket stage 2 further comprises a support ring 22. The support ring 22 is a hollow cylinder that sits on top of the rocket propellant tank assembly 4. The support ring 22 extends the cylindrical outer shape of the rocket propellant tank assembly 4 upwards. The support ring 22 may also be referred to as skirt of the rocket propellant tank assembly 4.

The recoverable rocket stage 2 further comprises four drag enhancing elements 8. The drag enhancing elements are attached to the support ring 22. In particular, the drag enhancing elements 8 are attached to the support ring 22 via hinges 12. For each one of the drag enhancing elements 8, a respective hinge 12 is provided. The hinges 12 allow for rotation of the drag enhancing elements 8 around the respective hinge axes.

The drag enhancing elements 8 are coupled to the rocket propellant tank assembly 4 via the support ring 22. The drag enhancing elements 8 are inclinable with respect to the cylindrical outer shape of the rocket propellant tank assembly 4. In particular, the rotation of a drag enhancing element 8 around a hinge 12 results in an inclination with respect to the cylindrical outer shape of the rocket propellant tank assembly 4.

The drag enhancing elements 8 have the shape of cylinder shell portions. In other words, the drag enhancing elements 8 have shapes that correspond to cut-out parts of a hollow cylinder. In the exemplary embodiment of FIG. 1, the drag enhancing elements have four edges, with the upper and lower edges being circular arc portions and the left and right edges being straight, parallel edges. The outer surfaces of the drag enhancing elements 8 are continuous surfaces and are parts of a cylinder surface.

Each of the drag enhancing elements 8 is movable between a launch position and one or more inclined positions. In FIG. 1, the drag enhancing elements 8 are depicted in inclined positions. In particular, in the inclined positions of FIG. 1, the directions of longitudinal extension of the drag enhancing elements 8 have an angle of between 70° and 80° with respect to the cylindrical outer shape of the rocket propellant tank assembly 4.

In their launch positions, the drag enhancing elements 8 form longitudinal extensions of the cylindrical outer shape of the rocket propellant tank assembly 4. When the recoverable rocket stage 2 is oriented vertically, such as before the launch of the rocket, the drag enhancing elements 8 are in an upright orientation in their launch positions. The outer surfaces of the drag enhancing elements 8, which are parts of a cylinder surface, extend the cylindrical outer surface of the rocket propellant tank assembly 4 upwards. In the exemplary embodiment of FIG. 1, the four drag enhancing elements 8 jointly form a hollow cylinder, when in their launch positions. In particular, the four drag enhancing elements 8 form a cylinder shell that extends the rocket propellant tank assembly 4 and the support ring 22. The drag enhancing elements 8 may be seen as having the shape of quarter pipe sections.

The recoverable rocket stage 2 further comprises an actuator assembly 10. The actuator assembly 10 is configured to move the drag enhancing elements 8 between their launch positions and their inclined positions. The actuator assembly 10 comprises the four hinges 12, discussed above, and four inclining actuators 14. Each of the inclining actuators 14 is arranged between a center rod 20 and a respective support element 18, arranged on the respective drag enhancing element 8. The support elements 18 are provided for spreading the inclining forces, as exerted by the inclining actuators 14, across a larger area of the drag enhancing elements 8. Also, the support elements 18 provide structural support to the drag enhancing elements 8 in operation. The center rod 20 is a push rod, configured to push the recoverable rocket stage 2 and a further rocket stage apart after burn out of the recoverable rocket stage 2. The center rod 20 may thus have the dual purpose of helping the mechanical separation of the recoverable rocket stage 2 and a further rocket stage and of providing a mechanical support structure for the inclining actuators 14.

The actuator assembly 10 further comprises four pitch actuators 16. Each one of the four pitch actuators 16 is associated with one of the four drag enhancing elements 8. The pitch actuators 16 are configured to rotate the drag enhancing elements 8 around their longitudinal axes. The rotation around the longitudinal axes is also referred to as tilting of the drag enhancing elements 8. Via this tilting, the pitch of the drag enhancing elements may be adapted. In FIG. 1, the drag enhancing elements 8 are depicted in an un-tilted state.

Figure 2:
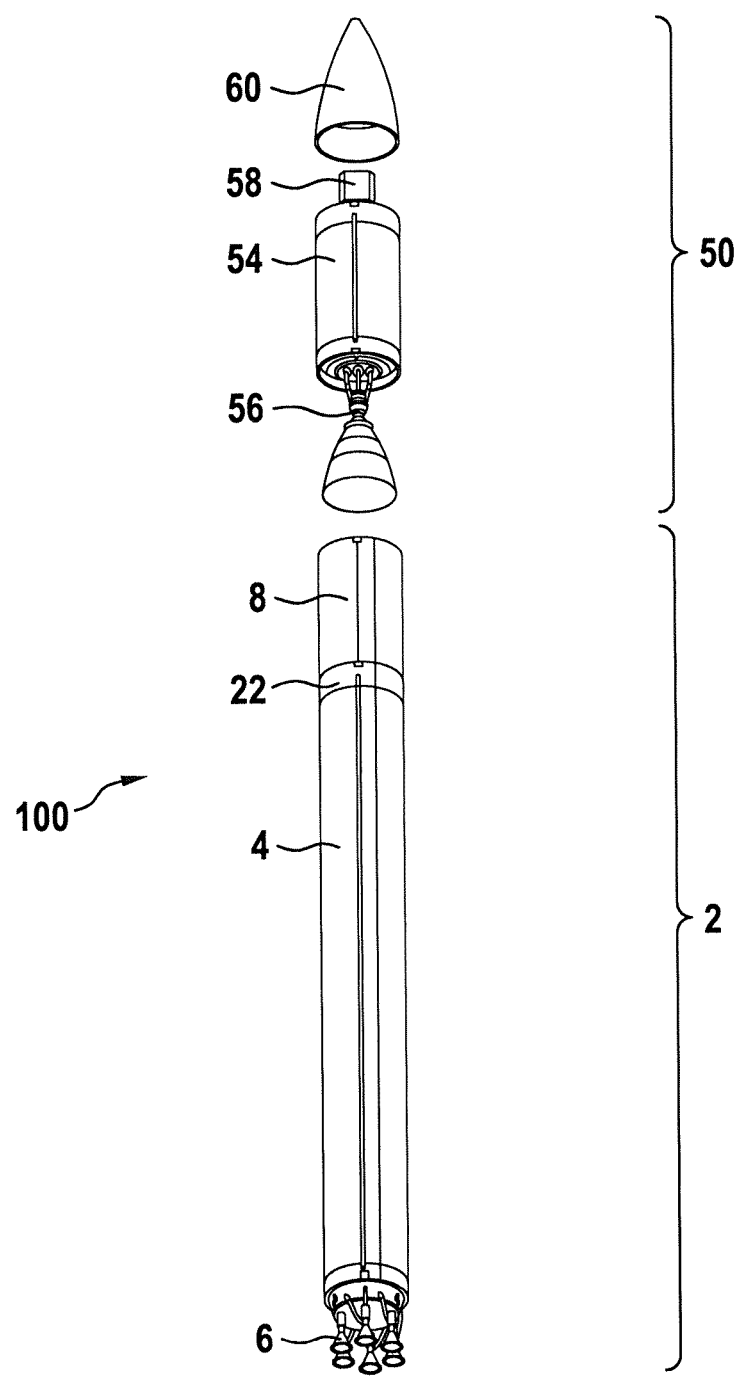
FIG. 2 shows a multi-stage rocket, having the recoverable rocket stage of FIG. 1, in an exploded side view.

FIG. 2 shows a multi-stage rocket 100 comprising a recoverable rocket stage 2, which is the primary rocket stage of the multi-stage rocket 100, and a further rocket stage 50, which is the secondary rocket stage of the multi-stage rocket 100, in an exploded side view. The recoverable rocket stage 2 of the multi-stage rocket 100 of FIG. 1 is the recoverable rocket stage 2 of FIG. 1. The plurality of drag enhancing elements 8 are in their launch positions, such that they from a hollow cylinder on top of the rocket propellant tank assembly 4 of the recoverable rocket stage 2.

The further rocket stage 50 comprises a rocket propellant tank assembly 54, an engine 56, and a fairing 60. The fairing 60 is separable from the rocket propellant tank assembly 54. The object to be carried into space is arranged between the rocket propellant tank assembly 54 of the further rocket stage 50 and the fairing 60. In the exemplary embodiment of FIG. 2, the object to be carried into space is a small satellite 58.

While being shown in an exploded view, it is understood that the components of the multi-stage rocket 100 are attached to each other for the start. When attaching the components, the engine 56 of the further rocket stage 50 is surrounded by the plurality of drag enhancing elements 8 in their launch positions. The plurality of drag enhancing elements 8 provide for a coupling of the rocket propellant tank assembly 4 of the recoverable rocket stage 2 and the rocket propellant tank assembly 54 of the further rocket stage 50. The plurality of drag enhancing elements 8 thus form an interstage support structure. The cylindric shape, jointly provided by the drag enhancing elements 8, blends into the overall cylindric shape of the multi-stage rocket 100.

FIG. 3 illustrates the operation of the multi-stage rocket 100 of FIG. 2, including the operation of the recoverable rocket stage 2 of FIG. 1, during various launch and return phases in a perspective view.

FIG. 3A shows the multi-stage rocket 100 shortly after take-off. The recoverable rocket stage 2 and the further rocket stage 50 are attached to each other. The multi-stage rocket 100 is an integrated structure. As the engine of the further rocket stage 50 is contained in the hollow cylinder, formed by the drag enhancing elements 8 of the recoverable rocket stage 2, the recoverable rocket stage 2 and the further rocket stage 50 overlap in the longitudinal dimension of the multi-stage rocket 100. The multi-stage rocket 100 is shown in a slightly angled orientation in FIG. 3A, which indicates that the multi-stage rocket 100 has left the initial vertical launch phase and has entered into its gravity turn.

Figure 3B:
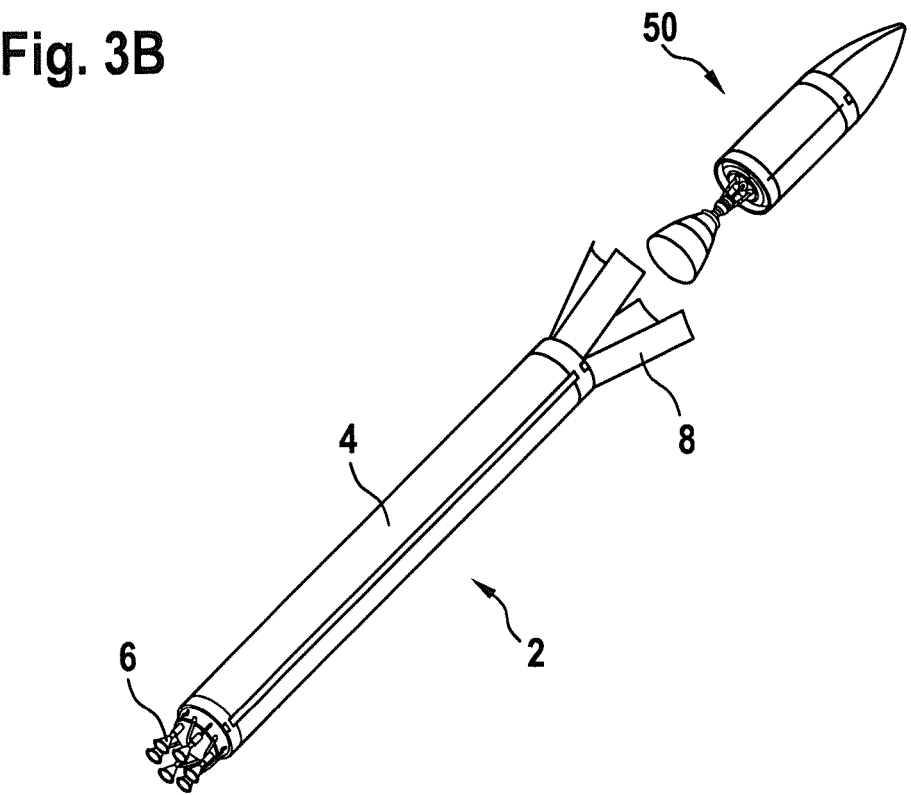
FIG. 3 illustrates the operation of the multi-stage rocket of FIG. 2, including the operation of the recoverable rocket stage of FIG. 1, during various launch and return phases in a perspective view.

FIG. 3B shows the recoverable rocket stage 2 and the further rocket stage 50 shortly after separation. In particular, FIG. 3B shows the recoverable rocket stage 2 and the further rocket stage 50, after the drag enhancing elements 8 have de-coupled from the further rocket stage 50 and have transferred from their launch positions to inclined positions. The drag enhancing elements 8 are shown after having opened up in a petal-like manner, allowing the engine of the further rocket stage 50 to move freely from the recoverable rocket stage 2. Also, the recoverable rocket stage 2 and the further rocket stage 50 are shown after the center rod, described above with respect to FIG. 1, has given the further rocket stage 50 a push away from the recoverable rocket stage 2. In this way, an initial distance between the recoverable rocket stage 2 and the further rocket stage 50 is created, before the further rocket stage 50 ignites. As can be seen in FIG. 3B, the recoverable rocket stage 2 and the further rocket stage 50 are still substantially aligned shortly after separation.

Figure 3C:
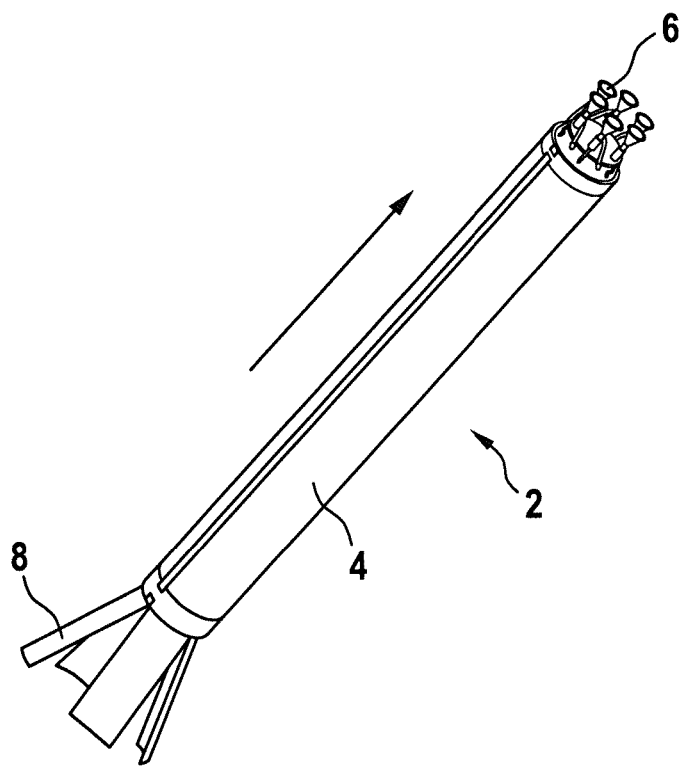

After having separated from the recoverable rocket stage 2, the further rocket stage 50 is ignited. The engine plume of the further rocket stage 50 hits the recoverable rocket stage 2, in particular the drag enhancing elements 8 thereof, and causes the recoverable rocket stage 2 to tumble. While still generally following its previous trajectory, the recoverable rocket stage 2 is being re-oriented by said tumbling. In particular, the inclined drag enhancing elements 8 help in orienting the recoverable rocket stage 2 in such a way that the engines 6 are at the front of the recoverable rocket stage 2 and that the drag enhancing elements 8 are at the rear of the recoverable rocket stage 2. The re-oriented recoverable rocket stage 2 is depicted in FIG. 3C, with the direction of travel indicated by an upwards pointing arrow.

Figure 3D:
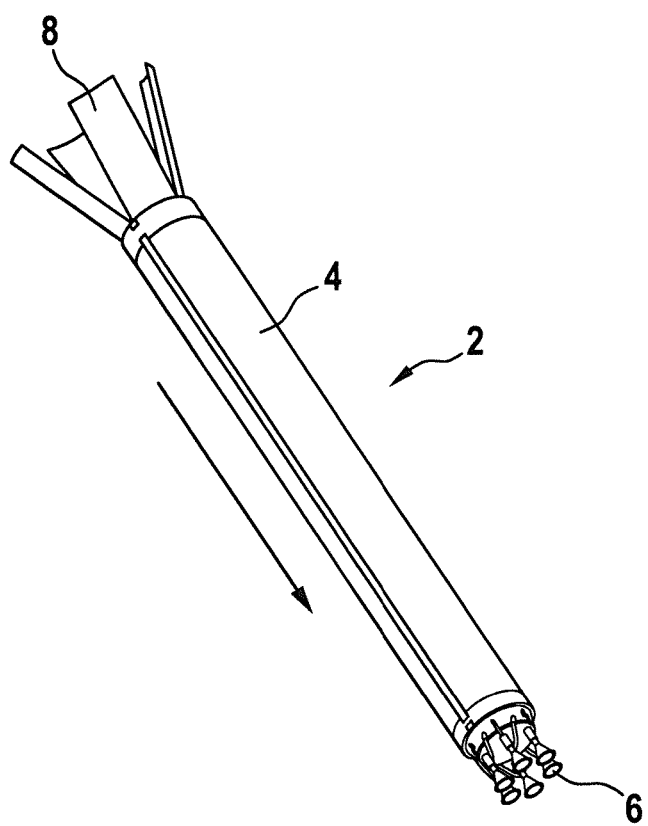

Without any further thrust, the recoverable rocket stage 2 reaches its apogee and starts falling back to earth. The fall through the atmosphere is generally referred to as re-entry herein, irrespective of whether all layers of the atmosphere are traversed or only a subset. With the drag enhancing elements 8 being inclined with respect to the rocket propellant tank assembly 4, the recoverable rocket stage 2 starts falling with the engines 6 first. This situation is depicted in FIG. 3D, with the direction of travel being indicated by a downwards pointing arrow.

During the fall through the atmosphere, the drag enhancing elements 8 provide for a particularly efficient slowing down of the recoverable rocket stage 2. In particular, the drag enhancing elements 8 may counter the earth's gravity in an efficient manner. In this way, a beneficial velocity profile during the fall may be achieved.

Figure 3E:
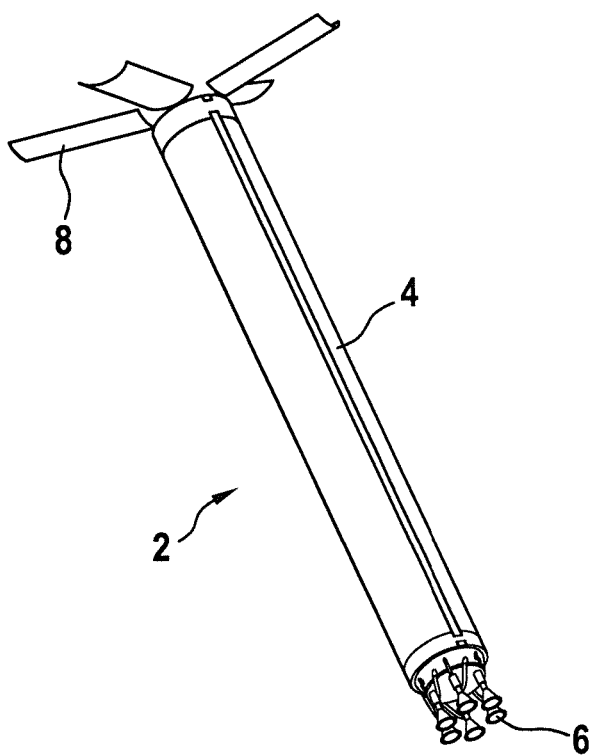
Figure 4A:
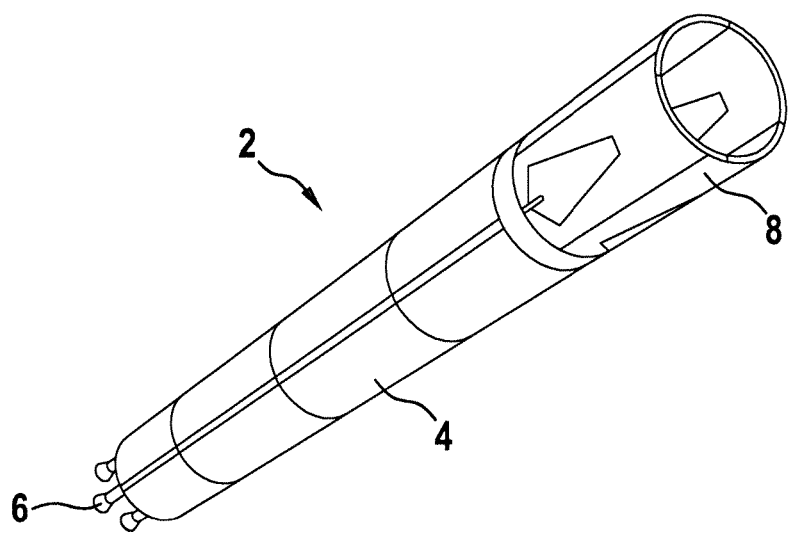
FIG. 4 shows various operating configurations of the recoverable rocket stage of FIG. 1 in a perspective view.
Figure 4B:
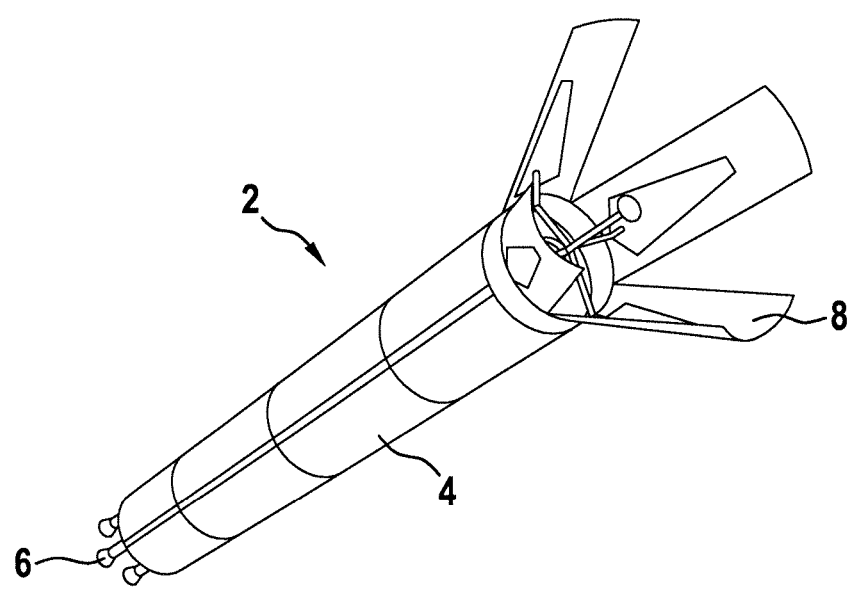
Figure 4C:
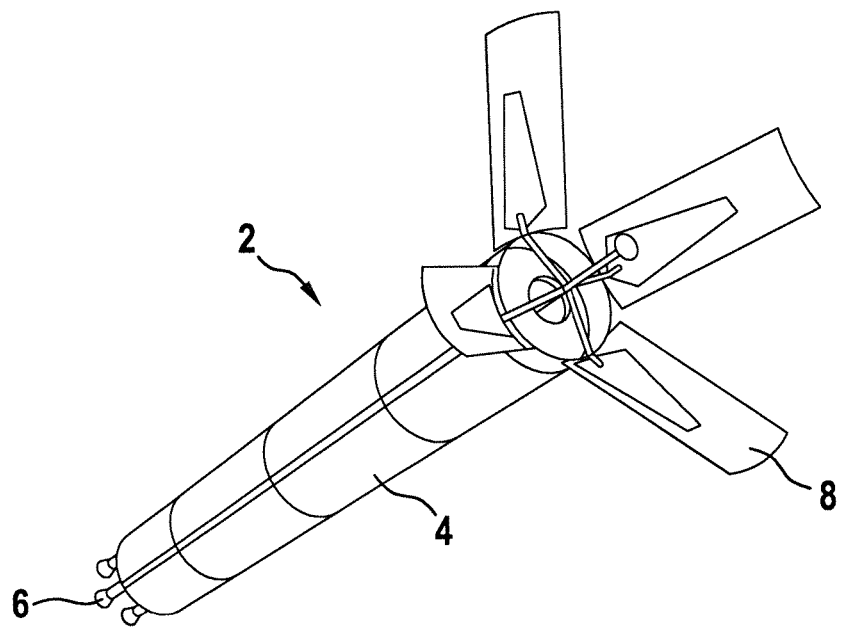
Figure 4D:
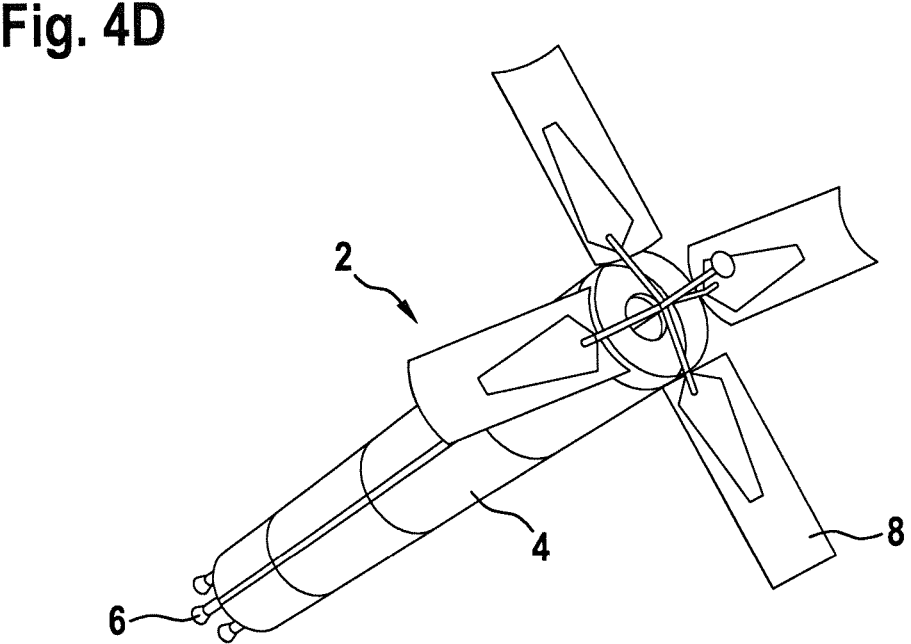

FIG. 3E shows the recoverable rocket stage 2 during the final stages of the fall, i.e. during the terminal descent towards the earth. The drag enhancing elements 8 are inclined at an angle of almost 90° with respect to the cylindrical outer shape of the rocket propellant tank assembly 4. In this way, the drag enhancing elements provide for a strong deceleration before impact on the ground, e.g. before water ingress.

FIG. 4 shows various operating configurations of the recoverable rocket stage 2 of FIG. 1 in a perspective view. In particular, the recoverable rocket stage 2 is shown in various operating configurations in a top perspective view, providing a detailed view of the different positions of the drag enhancing elements 8. In FIG. 4A, the drag enhancing elements 8 are in their launch positions, jointly forming a cylinder shell that extends the cylindrical outer shape of the rocket propellant tank assembly 4. In FIG. 4B, the drag enhancing elements 8 are in an inclined position. In particular, the drag enhancing elements 8 are inclined at an angle of about 20° with respect to the cylindrical outer shape of the rocket propellant tank assembly 4. This inclination angle may be suitable for the initial opening of the drag enhancing element during de-coupling of the recoverable rocket stage 2 from a further rocket stage and/or for the slowing down of the recoverable rocket stage 2 during re-entry. In FIG. 4C, the drag enhancing elements 8 are inclined at an angle of about 60° with respect to the cylindrical outer shape of the rocket propellant tank assembly 4. In FIG. 4D, the drag enhancing elements 8 are inclined at an angle of about 90° with respect to the cylindrical outer shape of the rocket propellant tank assembly 4. The inclination angles of FIGS. 4C and 4D may be well-suited to the final stages of the descent towards the earth.

Figure 5A:
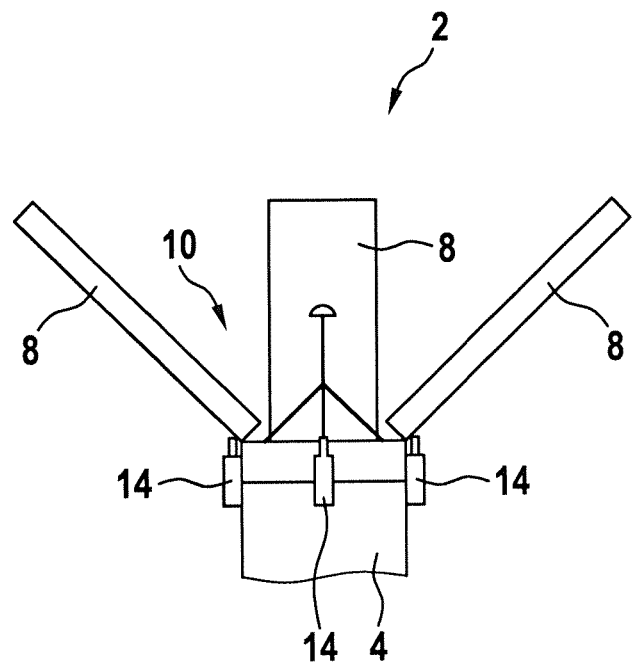
FIG. 5 shows various embodiments of an actuator assembly, which may be used in a recoverable rocket stage in accordance with exemplary embodiments of the invention, in a side view.
Figure 5B:
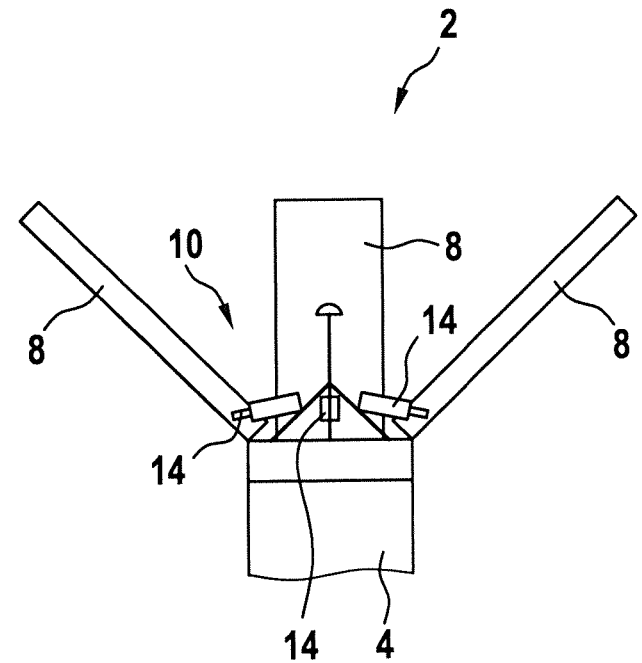
Figure 5C:
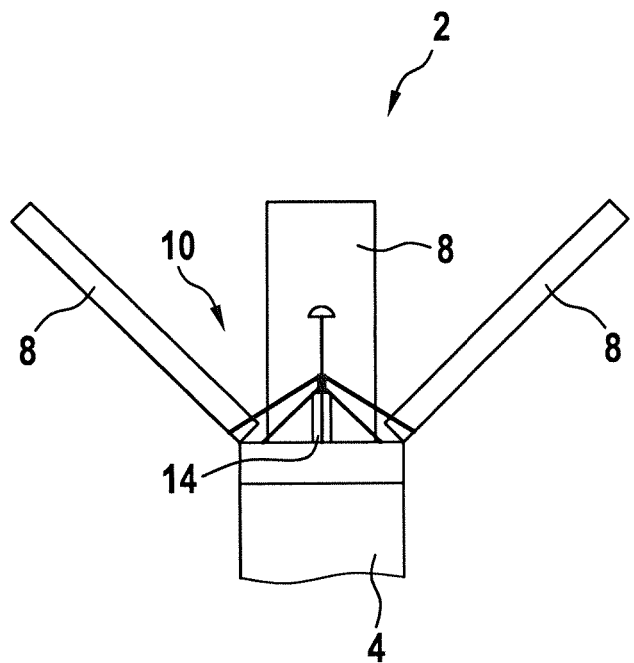

FIG. 5 shows various embodiments of an actuator assembly 10, which may be used in a recoverable rocket stage 2 in accordance with exemplary embodiments of the invention, in a side view. In the embodiment of FIG. 5A, the actuator assembly 10 has four inclining actuators 14, three of which are shown in the viewing direction of FIG. 5A. The inclining actuators 14 are arranged longitudinally in the coordinate system of the rocket propellant tank assembly 4. They interact with the drag enhancing elements 8 on their outer surfaces. In the embodiment of FIG. 5B, the actuator assembly 10 has four inclining actuators 14, three of which are shown in the viewing direction of FIG. 5B. The inclining actuators 14 are arranged generally radially in the coordinate system of the rocket propellant tank assembly 4. They are arranged to the inside of the drag enhancing elements 8 and interact with the drag enhancing elements 8 on their inner surfaces. In the embodiment of FIG. 5C, the actuator assembly 10 has one inclining actuator 14. The inclining actuator 14 is arranged longitudinally in the coordinate system of the rocket propellant tank assembly 4. It provides for a longitudinal actuation, which is translated into an inclining action by connection rods between the inclining actuator 14 and the plurality of drag enhancing elements 8. It is understood that the actuator assemblies 10 of FIG. 5 are exemplary and that any suitable actuator assembly may be used.

Figure 6:
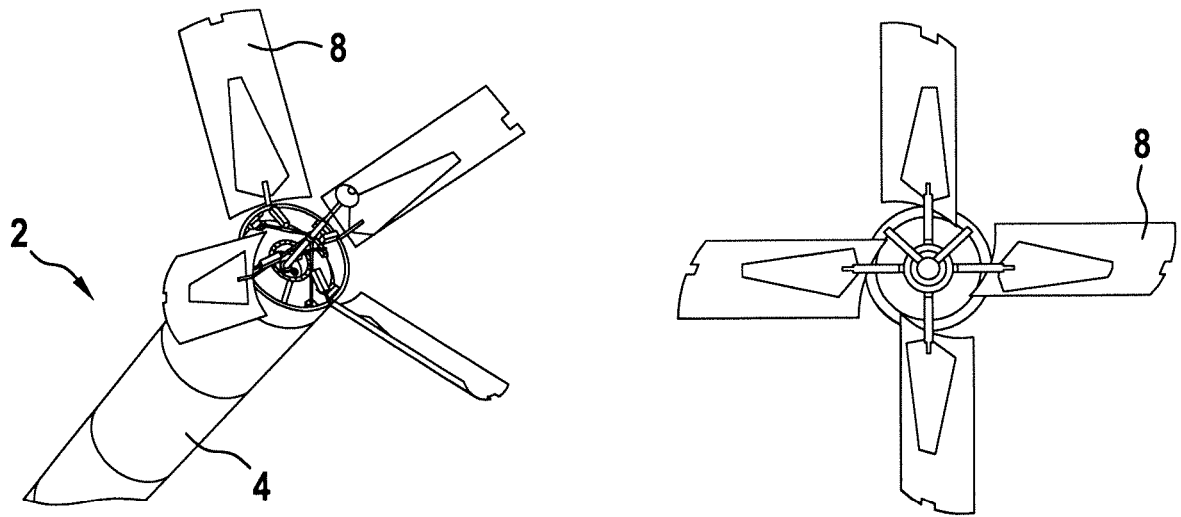
FIG. 6 shows a further operating configuration of the recoverable rocket stage of FIG. 1, both in a perspective view and in a top view.

FIG. 6 shows a further operating configuration of the recoverable rocket stage 2 of FIG. 1, both in a perspective view, depicted on the left in FIG. 6, and in a top view, depicted on the right in FIG. 6. The drag enhancing elements 8 are inclined with respect to the cylindrical outer shape of the rocket propellant tank assembly 4 at an angle similar to the angle of FIG. 1. In addition to being inclined, the drag enhancing elements 8 are also tilted around their longitudinal axes. In particular, all four drag enhancing elements 8 are tilted about 20° clock-wise. The drag enhancing elements 8 may thus impart an angular momentum onto the recoverable rocket stage 2 during descent and may slow down the recoverable rocket stage 2 even further.

Figure 7:
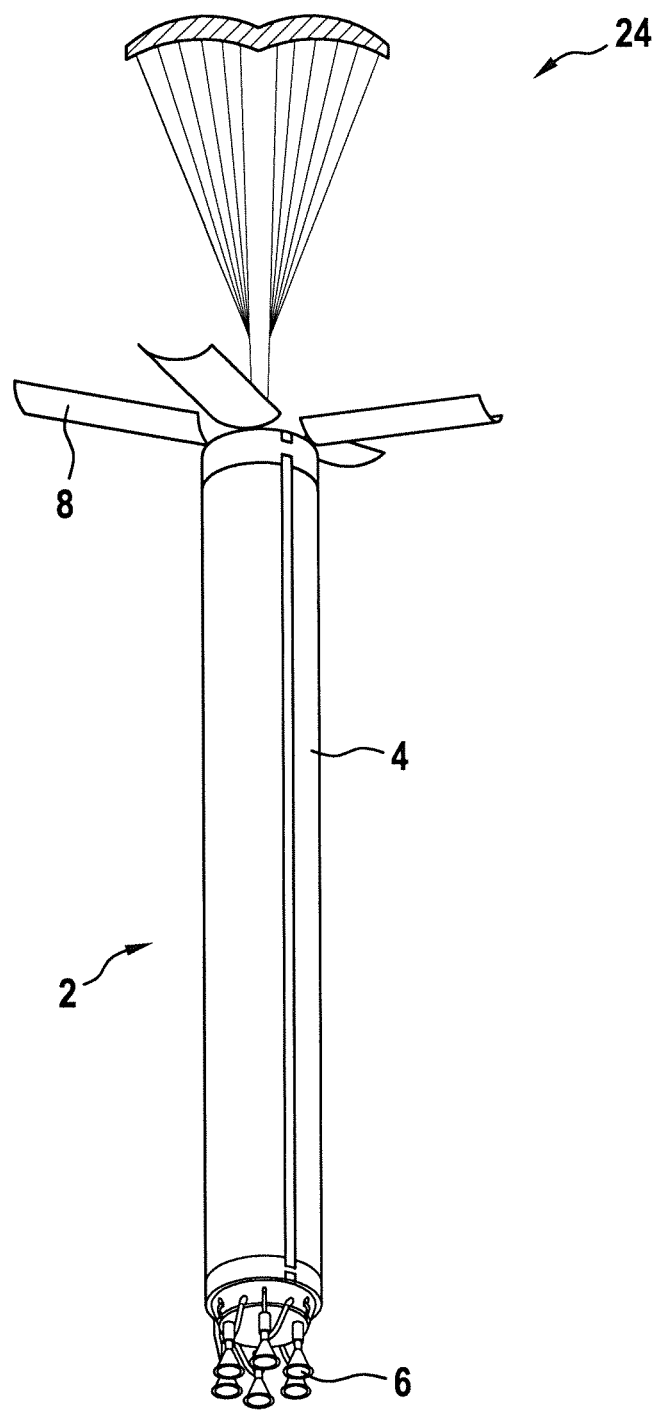
FIG. 7 shows a recoverable rocket stage in accordance with an exemplary embodiment of the invention with a deployed parachute in a side view.

FIG. 7 shows a recoverable rocket stage 2 in accordance with an exemplary embodiment of the invention with a deployed parachute 24 in a side view. The deployed parachute 24 is part of a parachute system that comprises the parachute 24 and an actuation mechanism. The parachute 24 is another means of achieving a particularly low speed during the terminal descent of the recoverable rocket stage 2, allowing for a low-impact landing of the recoverable rocket stage 2.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. A multi-stage rocket comprising a recoverable rocket stage for propelling the multi-stage rocket towards space, the recoverable rocket stage comprising:
   a rocket propellant tank assembly having a generally cylindrical outer shape;
   at least one engine, coupled to the rocket propellant tank assembly; and
   a plurality of drag enhancing elements, wherein the plurality of drag enhancing elements form longitudinal extensions of the generally cylindrical outer shape of the rocket propellant tank assembly, jointly forming a hollow cylinder, in their launch positions and wherein the plurality of drag enhancing elements are inclinable with respect to the generally cylindrical outer shape of the rocket propellant tank assembly for return of the recoverable rocket stage to earth, and
   wherein the plurality of drag enhancing elements are structural connection elements between the recoverable rocket stage and a further rocket stage of the multi-stage rocket.

2. The multi-stage rocket according to claim 1, wherein the recoverable rocket stage further comprises:
   an actuator assembly configured to incline the plurality of drag enhancing elements with respect to the generally cylindrical outer shape of the rocket propellant tank assembly.

3. The multi-stage rocket according to claim 2, wherein the actuator assembly comprises, for each of the plurality of drag enhancing elements, a hinge, coupling a first end of the respective drag enhancing element to the rocket propellant tank assembly, and an actuator for rotating the respective drag enhancing element around the hinge.

4. The multi-stage rocket according to claim 1, wherein the plurality of drag enhancing elements comprise between between 3 and 6 drag enhancing elements.

5. The multi-stage rocket according to claim 1, wherein the plurality of drag enhancing elements are cylinder shell portions.

6. The multi-stage rocket according to claim 1, wherein the plurality of drag enhancing elements jointly form a cylinder shell in their launch positions.

7. The multi-stage rocket according to claim 1, wherein each of the plurality of drag enhancing elements has a continuous outer surface.

8. The multi-stage rocket according to claim 1, wherein the plurality of drag enhancing elements form at least part of an interstage support structure.

9. The multi-stage rocket according to claim 1, wherein the at least one engine of the recoverable rocket stage is arranged on a first end portion of the rocket propellant tank assembly of the recoverable rocket stage and wherein the plurality of drag enhancing elements are arranged on a second end portion of the rocket propellant tank assembly, opposite the first end portion.

10. The multi-stage rocket according to claim 1, having at least one of the following features:
   the recoverable rocket stage comprises a parachute system, and
   (ii) one or more of the at least one engine are capable of restarting.

11. A method for launching a multi-stage rocket and for returning a recoverable rocket stage of the multi-stage rocket to earth, wherein the recoverable rocket stage comprises a plurality of drag enhancing elements, the method comprising:
   launching the multi-stage rocket, with the plurality of drag enhancing elements forming longitudinal extensions of a generally cylindrical outer shape of a rocket propellant tank assembly of the recoverable rocket stage, with the plurality of drag enhancing elements jointly forming a hollow cylinder, and with the plurality of drag enhancing elements forming structural connection elements between the recoverable rocket stage and a further rocket stage of the multi-stage rocket, and
   returning the recoverable rocket stage to earth, with the plurality of drag enhancing elements being inclined with respect to the generally cylindrical outer shape of the rocket propellant tank assembly.

12. The method according to claim 11, further comprising:
   de-coupling the recoverable rocket stage from the further rocket stage, and
   inclining the plurality of drag enhancing elements with respect to the generally cylindrical outer shape of the rocket propellant tank assembly for re-orienting the recoverable rocket stage.

13. The method according to claim 11, further comprising:
   inclining the plurality of drag enhancing elements with respect to the generally cylindrical outer shape of the rocket propellant tank assembly for slowing down the recoverable rocket stage during re-entry.

14. The multi-stage rocket according to claim 1, wherein the plurality of drag enhancing elements comprise 4 drag enhancing elements.

15. The multi-stage rocket according to claim 1, wherein the plurality of drag enhancing elements are rotatable around their longitudinal axes for controlling rotation of the recoverable rocket stage around its longitudinal axis.

16. A multi-stage rocket, comprising a recoverable rocket stage for propelling the multi-stage rocket towards space, the recoverable rocket stage comprising:
- a rocket propellant tank assembly having a generally cylindrical outer shape;
- at least one engine, coupled to the rocket propellant tank assembly; and
- a plurality of drag enhancing elements, wherein the plurality of drag enhancing elements form longitudinal extensions of the generally cylindrical outer shape of the rocket propellant tank assembly, jointly forming a closed ring structure, in their launch positions and wherein the plurality of drag enhancing elements are inclinable with respect to the generally cylindrical outer shape of the rocket propellant tank assembly for return of the recoverable rocket stage to earth, and
- wherein the plurality of drag enhancing elements are structural connection elements between the recoverable rocket stage and a further rocket stage of the multi-stage rocket.

17. The multi-stage rocket according to claim 16, wherein the recoverable rocket stage further comprises:
- an actuator assembly configured to incline the plurality of drag enhancing elements with respect to the generally cylindrical outer shape of the rocket propellant tank assembly.

18. The multi-stage rocket according to claim 17, wherein the actuator assembly comprises, for each of the plurality of drag enhancing elements, a hinge, coupling a first end of the respective drag enhancing element to the rocket propellant tank assembly, and an actuator for rotating the respective drag enhancing element around the hinge.

19. The multi-stage rocket according to claim 16, wherein the plurality of drag enhancing elements comprise between 3 and 6 drag enhancing elements.

20. The multi-stage rocket according to claim 16, wherein the plurality of drag enhancing elements are rotatable around their longitudinal axes for controlling rotation of the recoverable rocket stage around its longitudinal axis.

* * * * *